Nov. 18, 1969   A. PITNER   3,479,100
JOURNAL ROLLING BEARING HAVING A BUILT-IN SEALING ELEMENT
Filed Sept. 13, 1968   2 Sheets-Sheet 2
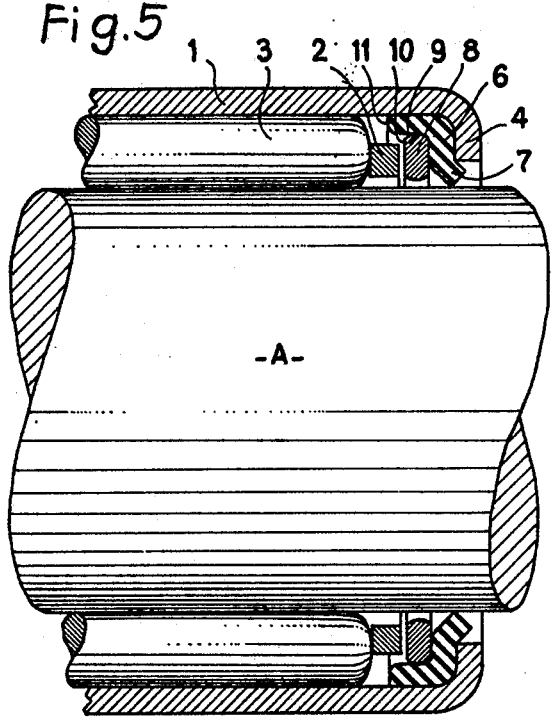
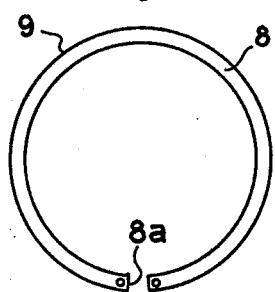
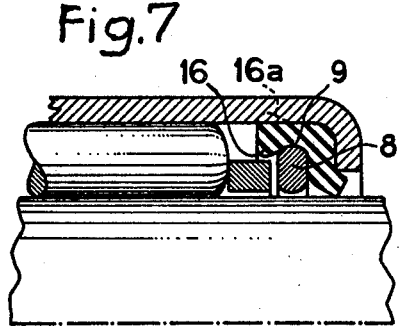

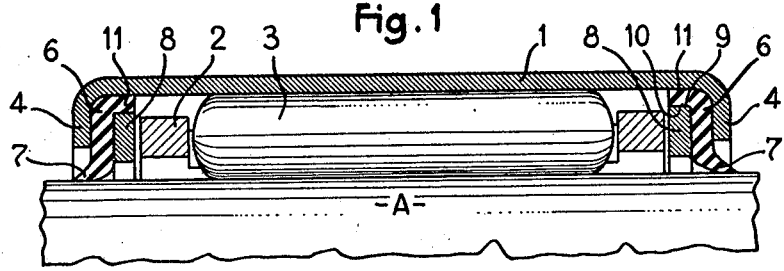
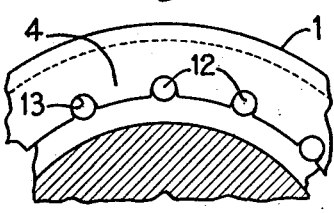
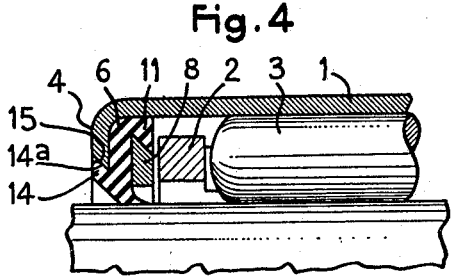

3,479,100
JOURNAL ROLLING BEARING HAVING A BUILT-IN SEALING ELEMENT
Alfred Pitner, Paris, France, assignor to Nadella S.A., Malmaison, France, a French body corporate
Continuation-in-part of application Ser. No. 559,209, June 21, 1966. This application Sept. 13, 1968, Ser. No. 759,559
Claims priority, application France, Sept. 15, 1967, 121,096
Int. Cl. F16c 1/24, 33/78; F16j 15/00
U.S. Cl. 308—187.2                                6 Claims

ABSTRACT OF THE DISCLOSURE

A journal needle bearing with sealing elements. A shaft is surrounded by a thin steel cylindrical jacket having radially inward end flanges. Between the jacket and the shaft are roller needles held by a cage. A washer and seal having an axial flange are between the ends of the cage and the flanges of the jacket. The flange of the seal is compressed by the washer against the jacket without deforming the jacket. The washer can be rigid or can be a split ring. The washer, jacket and seal can have interlocking counter-tapers to avoid displacement and ensure sealing.

---

This application is a continuation-in-part of application Ser. No. 559,209, filed June 21, 1966, now abandoned. The present invention relates to journal rolling bearings having needles and including a thin cylindrical ring provided with two radial shoulders which axially retain the needles, at least one of said shoulders serving as a support face for a flexible annular sealing element combined with a thrust washer adjacent the ends of the needles or the edge of the cage containing the needles.

In order to ensure that the sealing element is stationary relative to the ring, it has been proposed to interconnect the washer and the ring by means of a tight mounting of the washer in the bore of the ring.

However, this arrangement has a drawback in that the force fit of the washer in the thin cylindrical wall of the ring tends to deform the latter and the positioning of the ring in the bore of the mechanical part which must receive it in turn results in a deformation and an abnormal stress in the thrust washer.

In order to avoid this drawback, the invention provides a journal rolling bearing in which the annular sealing element comprises an axial flange against which the periphery of the thrust washer is applied with a negative clearance so that the axial flange is radially compressed in contact with the ring.

In this way, the annular sealing element is held stationary by the clamping of a material which is, for example, an elastomer and in practice no deformation of the thin ring results.

The reaction on the thrust washer of the axial flange which is clamped in contact with the ring tends to interconnect the washer and the sealing element, but this interconnection can be rendered stronger, for example, by vulcanization or by interlocking parts or by providing a non-circular or irregular shape for the axial surface of the thrust washer and the sealing element which are in contact with each other.

Further features and advantages of the invention will be apparent from the ensuing description with reference to the accompanying drawing.

In the drawing:

FIG. 1 is a longitudinal partially sectional view of a first embodiment of a rolling bearing according to the invention;

FIG. 2 is a similar view of a second embodiment of the invention;

FIG. 3 is an end elevational view of the second embodiment shown in FIG. 2;

FIG. 4 is a longitudinal partially sectional view of a third embodiment of the bearing according to the invention;

FIG. 5 is a longitudinal partially sectional view of one end of a rolling bearing according to a third embodiment of the invention;

FIG. 6 is an elevational view of an abutment washer used in said third embodiment; and FIG. 7 is a partially sectional view of a fourth embodiment which is a modification of the bearing shown in FIG. 5.

In the embodiment shown in FIG. 1, the bearing according to the invention comprises a hardened thin cylindrical outer ring or jacket 1 in which needles 3 are retained and guided in a cage 2. At its ends the ring 1 has radially inwardly extending shoulders or flanks 4, 4 against each of which is applied an annular sealing element or ring 6 composed of an elastomer and having a sealing lip 7 which is adapted to be applied in sliding contact against a shaft A around which the bearing is mounted.

The sealing element 6 is held stationary relative to the ring 1 by the effect of a rigid washer 8 adjacent the end of the cage 2. The outer periphery 9 of the washer is applied in contact with the inner face 10 of a cylindrical flange 11 of the sealing element 6, the diameter of the face 10 in free condition being less than the diameter of the periphery 9 of the washer so the flange 11 is radially compressed in contact with the ring 1.

In order to facilitate the positioning and improve the behavior in operation of the assembly consisting of the washer 8 and the sealing element 6, these two elements can be interconnected by adhesive or by vulcanization. They can also be interconnected, as shown in FIG. 2, by fitting them together and by an interlocking engagement achieved by giving the faces 9a, 10a conical shapes having counter-tapers. FIGS. 2 and 3 also show a positive interconnection between the element 6 and the shoulder or flank 4 obtained by means of circumferentially spaced studs 12 which are formed on the element 6 and engaged in notches or recesses 13 in the shoulder 4.

In FIG. 4 the interconnection between the element 6 and the shoulder 4 is improved by providing the element 6 with an additional axial flange 14 which has a counter-taper or tapered under cut and hooks onto the edge of correspondingly shaped edge 15 of the radial shoulder or flank 4.

Instead of being circular, the interengaging faces of the flange 11 and the ring 8 may be of polygonal or other non-circular shape to provide further interlock between the seal 6 and the ring 8 to avoid relative rotation of these members. The interengaging faces of the flange 14 and the radial shoulder 4 may likewise be non-circular.

The bearing is assembled by forming the ring 1 with only one shoulder, leaving the other end of the ring open. The sealing elements 6 with their washers 8 and the rollers 3 with the cage 2 are assembled through the open end of the ring. The second radial shoulder 4 is subsequently formed at the open end to retain the assembled elements in place.

A fourth embodiment of the invention is shown in FIGS. 5 and 6 in which like parts are identified by the same reference numerals. The bearing is essentially the same as is shown in FIG. 1 except that the seal 6 is of different cross sectional shape as shown and the washer on collar 8, instead of being a closed ring is made as a split ring with its ends separated by a gap 8a. This permits assembly of the seals 6 and washers 8 in the bearing after radial flanges 4 have been formed at both ends of the ring 1. The gap 8a is sufficiently large to permit contraction of the washer 8 to pass through the opening of the flange 4. When in position in the ring, the elastic washer 8 engages and compresses the cylindrical flange 11 of the sealing element 6 without, however, distorting the surrounding portion of the ring 1. The split washers 8 permit forming shoulders 4 at both ends of the ring 1 and heat treating the ring before insertion of the sealing elements 6 and washers 8. The washer 8 is conveniently made of wire and may be provided near its ends with small holes to receive a tool for contraction of the washer.

In order to facilitate the positioning of the washer 8 relative to the sealing element 6 and to improve performance of the assembly in operation, the inner periphery of the flange 11 may be of undercut or reentrant shape to receive the washer 8. As shown in FIG. 7, the reentrant shape is provided by an inner bead 16 on the flange 11. The bead is initially formed as an outer bead 16a as shown in broken lines and is deformed radially inwardly when the element 6 is placed in position in the ring 1.

The features of the several embodiments shown in the drawings are mutually interchangeable insofar as they are compatible. For example the interengaging faces of the washer 8 and flange 11 in FIGS. 5 and 7 may be non-circular, for example polygonal, as described with reference to FIGS. 1 to 4. Other modifications may be made in details of construction.

What I claim is:

1. In a journal needle bearing comprising a thin cylindrical drawn sheet metal outer ring having a generally cylindrical inner face and two radially extending inwardly facing end shoulders and needles located inside said ring and retained axially by said shoulders, a structure comprising a thrust washer having a peripheral outer face and located adjacent one end of the needles and an annular elastomer sealing element adjoining said washer on the side of the washer opposed to said needles, said washer being such that it is plane in its free state before mounting and when mounted in said bearing, and means for preventing said sealing element from rotating in said outer ring, said means comprising axially extending elastomer flange means on said sealing element and having an inner face which is an interference fit with said peripheral face of said washer, said peripheral face having a diameter less than that of said inner face of said outer ring and said flange means being in a radially compressed condition in a traverse plane containing said washer between said peripheral face and the inner face of said ring and maintaining the whole of said peripheral face spaced away from said inner face of said outer ring, said inner face of said flange means having a radially inwardly projecting bead portion which hooks over the outer periphery of said washer to position said washer relative to said sealing element.

2. A structure as claimed in claim 1, wherein said inner face of said flange means and said peripheral face have a non-circular shape.

3. A structure as in claim 2, wherein said non-circular shape is polygonal.

4. In a journal needle bearing comprising a thin cylindrical drawn sheet metal outer ring having a generally cylindrical inner face and two radially extending inwardly facing end shoulders and needles located inside said ring and retained axially by said shoulders, a structure comprising a thrust washer having a peripheral outer face and located adjacent one end of the needles and an annular elastomer sealing element adjoining said washer on the side of the washer opposed to said needles, said washer being such that it is plane in its free state before mounting and when mounted in said bearing, and means for preventing said sealing element from rotating in said outer ring, said means comprising axially extending elastomer flange means on said sealing element and having an inner face which is an interference fit with said peripheral face of said washer, said peripheral face having a diameter less than that of said inner face of said outer ring and said flange means being in a radially compressed condition in a transverse plane containing said washer between said peripheral face and the inner face of said ring and maintaining the whole of said peripheral face spaced away from said inner face of said outer ring, and projections on said sealing element and recesses in the corresponding radially extending shoulder adjacent said element, said projections extending into said recesses so as to render said sealing element stationary relative to said corresponding adjacent shoulder.

5. In a journal needle bearing comprising a thin cylindrical drawn sheet metal outer ring having a generally cylindrical inner face and two radially extending inwardly facing end shoulders and needles located inside said ring and retained axially by said shoulders, a structure comprising a thrust washer having a peripheral outer face and located adjacent one end of the needles and an annular elastomer sealing element adjoining said washer on the side of the washer opposed to said needles, said washer being such that it is plane in its free state before mounting and when mounted in said bearing, and means for preventing said sealing element from rotating in said outer ring, said means comprising axially extending elastomer flange means on said sealing element and having an inner face which is an interference fit with said peripheral face of said washer, said peripheral face having a diameter less than that of said inner face of said outer ring and said flange means being in a radially compressed condition in a transverse plane containing said washer between said peripheral face and the inner face of said ring and maintaining the whole of said peripheral face spaced away from said inner face of said outer ring, said sealing element further comprising an axially extending inner flange which is in hooking engagement with the adjacent radially extending shoulder.

6. In a journal needle bearing comprising a thin cylindrical drawn sheet metal outer ring having a generally cylindrical inner face and two radially extending inwardly facing end shoulders and needles located inside said ring and retained axially by said shoulders, a structure comprising a thrust washer having a peripheral outer face and located adjacent one end of the needles and an annular elastomer sealing element adjoining said washer on the side of the washer opposed to said needles, said washer being such that it is plane in its free state before mounting and when mounted in said bearing, and means for preventing said sealing element from rotating in said outer ring, said means comprising axially extending elastomer flange means on said sealing element and having an inner face which is an interference fit with said peripheral face of said washer, said peripheral face having a diameter less than that of said inner face of said outer ring and said flange means being in a radially compressed condition in a transverse plane containing said washer between said peripheral face and the inner face of said ring and maintaining the whole of said peripheral face spaced away from said inner face of said outer ring, said washer comprising a split elastically-yieldable collar whereby said collar is capable of being introduced through a previously-shouldered end of the ring by a radially contraction of the collar.

References Cited

UNITED STATES PATENTS

| | | | |
|---|---|---|---|
| 2,038,475 | 4/1936 | Brown | 308—217 X |
| 2,427,449 | 9/1947 | Dunn | 308—187.1 X |
| 2,467,049 | 4/1949 | Peterson | 308—187.2 X |
| 2,893,770 | 7/1959 | Puncet | 277—183 X |
| 3,003,835 | 10/1961 | Schindel | 308—187.2 |
| 3,167,363 | 1/1965 | Murphy | 308—174 |
| 3,206,829 | 9/1965 | Schaeffler | 29—148.4 |
| 3,348,889 | 10/1967 | Schaeffler | 308—187.2 |
| 3,362,719 | 1/1968 | McComick | 277—37 |

FOREIGN PATENTS 833,154 4/1960 Great Britain.

MARTIN P. SCHWADRON, Primary Examiner

L. L. JOHNSON, Assistant Examiner

U.S. Cl. X.R.

277—183